Nov. 9, 1965 R. KRIGSMAN 3,216,209
SUPERCRITICAL CRYOGENIC STORAGE SYSTEM
Filed Jan. 29, 1963 2 Sheets-Sheet 1
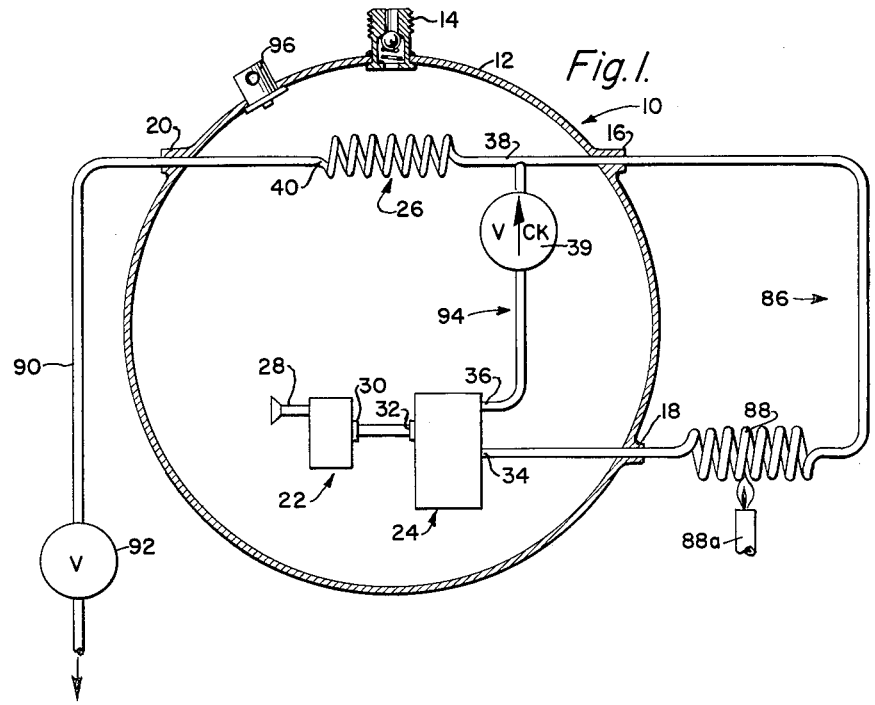
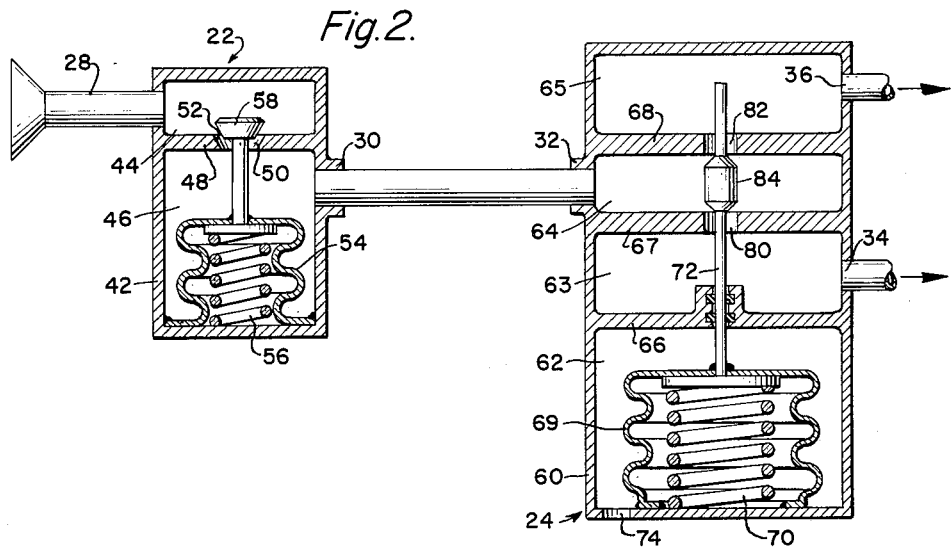
INVENTOR:
RONALD KRIGSMAN,
BY
Attorney.

United States Patent Office 3,216,209
Patented Nov. 9, 1965

3,216,209
SUPERCRITICAL CRYOGENIC STORAGE
SYSTEM
Ronald Krigsman, Los Angeles, Calif., assignor to The
Garrett Corporation, Los Angeles, Calif., a corporation
of California
Filed Jan. 29, 1963, Ser. No. 254,792
5 Claims. (Cl. 62—51)

This invention relates generally to the art of storing and delivering volatile liquids such as liquefied gases, especially liquefied gases whose boiling point is in the cryogenic temperature range. The invention relates more particularly to a supercritical storage vessel for systems of this kind and to a method of supercritical fluid storage and delivery.

Liquid storage and delivery systems are often required to possess the operational capability of supplying the stored liquid on demand from a storage vessel to a point of use regardless of the attitude of the vessel, or the static pressure and acceleration forces active on the contents of the storage vessel, or consumption of the contents. One common expedient for achieving this operational capability involves the use of a storage vessel having an internal displaceable pressure wall which separates the vessel interior into segregated spaces for the stored liquid and a pressurizing medium, respectively. This medium constantly urges the pressure wall against the stored liquid, whereby the latter constantly fills its respective space and thus is always available on demand, even in an operational environment of the kind under discussion. Though segregated storage vessels of this type are adaptable to use with a wide variety of liquids, the physical and chemical properties of certain liquids, such as liquefied gases, especially those whose boiling point is in the cryogenic temperature range, i.e., below −150° C., are incompatible with the use of a displaceable pressure wall.

In the case of these latter liquids, the operational capability, discussed above, is commonly achieved by maintaining the stored liquid in its supercritical state and converting the stored supercritical fluid to the liquidus state during its transfer from the storage vessel. One type of supercritical storage and delivery system, for example, is equipped with a supercritical storage vessel and a delivery line which leads from the vessel, through a first external heat exchanger disposed in heat transfer relation to an external heat source, then through a second internal heat exchanger disposed in heat transfer relation to the stored supercritical fluid within the storage vessel, and finally to the point of use through a pressure reducer. When in such a supercritical state, of course, the liquid or fluid in the vessel is a homogenous substance, normally referred to as a vapor or gas, which is constantly available on demand regardless of the attitude of the storage vessel or the forces active on the stored fluid.

The stored fluid is maintained in the supercritical state by the heat added to the stored fluid via the external heat exchanger and/or the heat leak through the vessel wall. Thus, if the rate of withdrawal of fluid from the storage vessel through the delivery line creates a pressure drop in the vessel which happens to exactly equal the pressure increase occasioned by heat leak into the vessel, the stored fluid will be maintained at constant pressure in its supercritical state, by such heat leak alone. If fluid is withdrawn from the vessel at a more rapid rate, the pressure of the fluid will tend to drop with the result that additional heat must be added to the stored fluid to maintain the latter in its supercritical state. This is accomplished by adding heat to the extract fluid as the latter flows through the external heat exchanger. A portion of this heat is then transferred to the stored fluid during subsequent flow of the extracted fluid through the internal heat exchanger.

The operation of the existing supercritical fluid storage and delivery system as thus far described poses no problem. The existing system becomes deficient however, when the rate of fluid withdrawal from the supercritical storage vessel becomes less than that required to offset the pressure rise occasioned by heat leak through the vessel wall. Under such low or minimum flow conditions, the pressure of the stored fluid increases. Eventually, of course, the fluid pressure rise would become sufficient to rupture the storage vessel unless steps were taken to avoid such excessive pressure rise.

In the case of the existing supercritical storage vessel the pressure of the stored fluid is maintained at or below a safe maximum level during low flow conditions by venting the vessel. It is for this purpose that the existing vessels are equipped with a vent line and pressure relief valve. This method of maintaining the pressure of the stored fluid at a safe level during periods of low flow is undesirable, of course, since it results in a waste of the stored fluid, which may be very substantial in many cases, and it presents a safety or health hazard where the stored fluid is flammable or toxic.

A general object of this invention is to provide a unique supercritical storage vessel construction and a method of supercritical fluid storage and delivery which increase the permissible heat leak into the stored fluid during minimum flow conditions.

Another object of the invention is to provide a supercritical storage vessel and a method of supercritical fluid storage and delivery in which the pressure of the stored fluid is maintained at a safe maximum level during periods of low flow without venting or otherwise wasting the stored fluid or creating a safety or health hazard.

Other objects, advantages, and features of the invention will become readily evident to those skilled in the art as the description proceeds.

Briefly, the objects of the invention are attained by providing a supercritical storage vessel and a method of supercritical fluid storage and delivery wherein the stored fluid is maintained in its supercritical state in somewhat the same way as described earlier in connection with the existing supercritical storage vessel, that is to say, by the addition of heat to the fluid extracted from the vessel and subsequent flow of the heated fluid through a heat exchanger in heat transfer relation to the stored fluid and/or by heat leak through the vessel wall. In the present storage invention, the fluid which is withdrawn from the vessel flows through a pressure reducer and a two-way bypass valve situated in the vessel. This valve has its inlet connected to the pressure reducer outlet and two outlets, one connected to the inlet of the external heat exchanger and the other connected to the inlet of the internal heat exchanger.

The bypass valve is made responsive to the pressure or temperature of the stored fluid in such manner that the extracted fluid is routed to the external heat exchanger so long as the pressure of the stored fluid remains below a preset level. As the pressure attains and exceeds this level, the valve operates to divert the fluid directly to the internal heat exchanger. At a preset maximum fluid pressure, the entire volume of fluid is rounted directly to the internal heat exchanger. During flow of the fluid through the pressure reducer, the pressure of the fluid is dropped below the critical pressure with a resultant transformation of the supercritical fluid to a two-phase (liquid and gas) fluid at lower temperature than the main body of supercritical fluid. During flow of this cooled two-phase fluid through the internal heat exchanger, it absorbs heat from and thereby recools the stored supercritical fluid to a safe pressure. The valve then operates to restore fluid flow through the external heat exchanger circuit.

A better understanding of the invention may be had from the following detailed description thereof taken in connection with the annexed drawings, wherein:

FIG. 1 diagrammatically illustrates a fluid delivery system incorporating the present supercritical fluid storage vessel;

FIG. 2 is an enlarged section through certain elements of the storage vessel;

Figure 3:
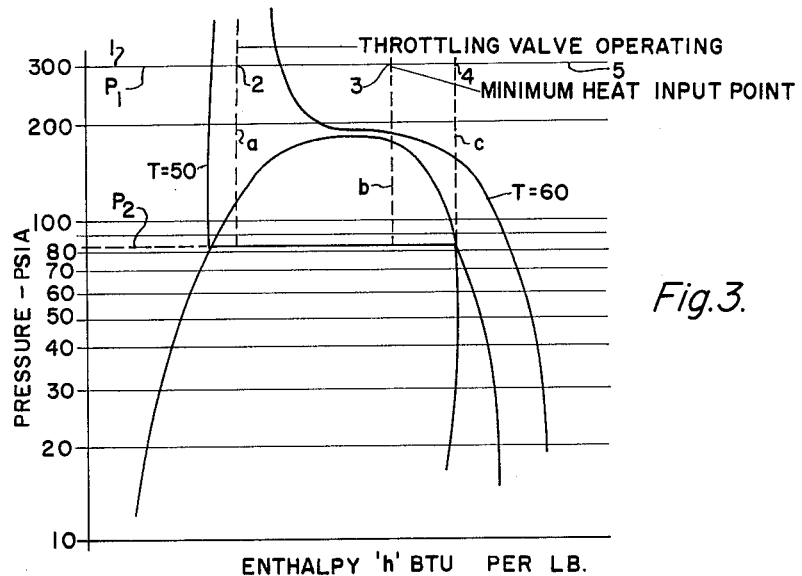
FIG. 3 is a pressure-enthalpy diagram illustrating the operation of the storage vessel.

In these drawings, the present supercritical storage vessel is designated by the numeral 10. This vessel, which may be of any desired shape, comprises a wall 12 provided with a valve filler opening 14, an inlet 16 and two outlets 18 and 20. While the vessel wall 12 has been illustrated simply as a shell, it is to be understood that the wall may have any conventional insulated construction, such as that of a doublewalled Dewar vessel. Mounted in any suitable manner within the vessel 10 are a pressure reducer or throttling valve 22, a bypass valve 24, and a heat exchanger 26.

Throttling valve 22 has an inlet 28 opening to the interior of vessel 10 and an outlet 30 communicating with the inlet 32 of bypass valve 24. Bypass valve 24 has two outlets 34 and 36. Outlet 34 communicates with the vessel outlet 18. Outlet 36 communicates with the inlet 38 of the internal heat exchanger 26 through a check valve 39. Heat exchanger inlet 38 also communicates with the vessel inlet 16. The outlet 40 of the heat exchanger 26 communicates with the storage vessel outlet 20.

It will become readily evident to those skilled in the art that various types of throttling valves and bypass valves may be utilized in the present storage vessel. FIG. 2 illustrates two valves which are suitable for this purpose. In this figure, throttling valve 22 is shown as comprising a housing 42, the interior of which is separated into two chambers 44 and 46 by an internal partition 48. Extending through this partition is a fluid passage 50 surrounded by a valve seat 52. Valve inlet 28 opens to valve chamber 44. Valve outlet 30 opens to valve chamber 46.

Within valve chamber 46 is a sealed evacuated bellows 54 enclosing a compression spring 56 and attached at one end to and end wall of the valve housing 42. Attached to the opposite end of the bellows 54 in a valve obturator 58 which is situated at the remote side of partition 48 from the bellows and moves toward valve seat 52 upon contraction of the bellows against the action of spring 56. It is evident, therefore, that during passage of fluid from the vessel 10 through the pressure reducing valve 22, the pressure of the fluid is dropped by a throttling action as the fluid flows between the valve seat 52 and the valve obturator 58. The opposing actions of the reduced fluid pressure and the force of spring 56 on the bellows 54 constantly positions the obturator in such a way as to maintain the fluid pressure relatively constant at the outlet 30 of the pressure reducing valve 22.

The illustrated bypass valve 24 comprises a housing 60 the interior of which is separated into chambers 62, 63, 64 and 65 by internal partitions 66, 67 and 68. Within chamber 62 is a bellows 69 enclosing a compression spring 70. One end of the bellows is attached to an end wall of the valve housing 60, as shown. Attached at one end to, and extending axially from the other end wall of the bellows 69 is a stem 72. Stem 72 extends slidably through the partition 66, suitable fluid sealing means (not shown) being provided to seal the stem to the partition. A port 74 in the valve housing 60 communicates the interior of the storage vessel 10 to the valve chamber 62.

Valve chamber 64 between partitions 67 and 68 communicates with the valve inlet 32. In the partitions 67 and 68 are ports 80 and 82 which communicate the chamber 64 with valve chambers 63 and 65, respectively. The valve stem 72 extends through ports 80 and 82 and is formed to provide a valve obturator 84 within the chamber 64. Valve obturator 84 is movable upwardly in FIG. 2 to close port 82 and downwardly to close port 80. Valve outlet 34 communicates with valve chamber 63 and valve outlet 36 communicates with valve chamber 65.

It is evident from the preceding description that pressure changes in the storage vessel 10 are communicated to the bypass valve chamber 62 through port 74. Decreasing pressure changes in the vessel effect extension of the valve bellows 69 under the action of spring 70 with resultant movement of the valve obturator 84 toward the valve port 82. This reduces fluid flow from the pressure reducer 22, through valve chamber 64, to the valve outlet 36 and increases fluid flow from the pressure reducer, through chamber 64, to valve outlet 34. Similarly, increasing pressure changes in the storage vessel 10 cause contraction of the bellows 69 against the action of its spring 70, thereby moving the valve obturator 84 toward port 80 to increase fluid flow from the pressure reducer 22 to the valve outlet 36 and decrease fluid flow from the pressure reducer to the valve outlet 34.

In operation, the inlet 16 and outlet 18 of the storage vessel 10 are connected to opposite ends of an external fluid circuit 86 including a heat exchanger 88 which functions as a heat absorber. The remaining storage vessel outlet 20 is connected to the end of a fluid delivery line 90 including a flow regulating delivery valve 92 and leading to a point of utilization of the stored fluid, or liquid.

When the delivery valve 92 is opened, fluid, in its supercritical state, is expressed from the storage vessel 10 through the pressure reducing valve 22 by the supercritical pressure existing in the vessel. As the fluid passes through the valve 22, its pressure is reduced below the critical pressure by an isenthalpic throttling process. The homogenous, supercritical fluid entering the valve is thereby transformed to a two-phase (liquid and gas) fluid which flows from the vessel through either the internal circuit 94, which is a refrigeration circuit as will be seen shortly, and/or through the external heat exchange circuit 86 to the delivery line 90.

Thus, referring to the pressure-enthalpy diagram of FIG. 3, the internal, supercritical operating pressure of the vessel 10 is designated as P1. By way of example, in a supercritical storage vessel for hydrogen, this operating pressure is typically on the order of 300 p.s.i.a., as shown. In this diagram, line 1–5 is the constant pressure line along which fluid withdrawal from the storage vessel occurs, point 1 representing the initial state of the fluid and point 5 the final state of the fluid. Typical fluid withdrawal points along this withdrawal line are indicated at 2, 3 and 4. The isenthalpic throttling process occurring in the pressure reducing valve 22 during fluid withdrawal at the withdrawal points 2, 3 and 4 takes place along the constant enthalpy lines $a$, $b$ and $c$, respectively. During the throttling along each of these lines the fluid is reduced in pressure from the supercritical operating pressure P1 to the subcritical pressure P2 at the outlet of the pressure reducer. At this latter pressure the fluid exists in its two-phase (liquid and gas) state, as is evident from the diagram of FIG. 3.

As fluid is withdrawn from the storage vessel, the density of the remaining fluid decreases. The heat input to the remaining fluid required to maintain the latter in its supercritical state thereby also varies. The way in which the heat input varies with fluid density at a given constant minimum flow rate and fluid pressure is illustrated by the typical curve of FIG. 4. As shown in this figure, the heat input required to maintain the fluid in the storage vessel in its supercritical state initially decreases as the fluid density decreases due to withdrawal of fluid from the vessel. This decrease in required heat input continues until a critical fluid density D is reached. The required heat input to maintain the supercritical state then rises sharply as the fluid density decreases below the critical density D.

Figure 4:
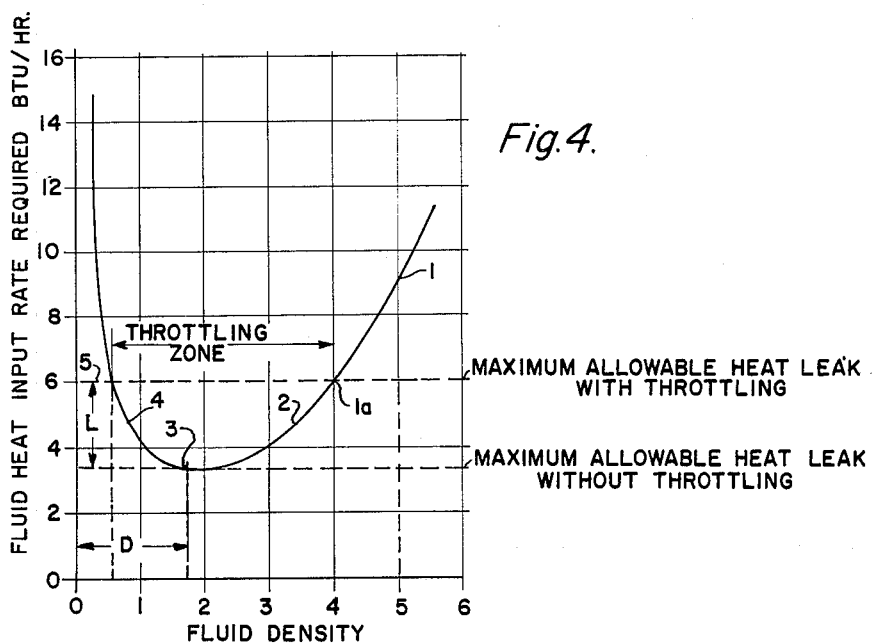
FIG. 4 is a heat input-fluid density diagram illustrating the operation of the storage vessel.

It is evident from the curve that if a constant supercritical pressure is to be maintained in the usual supercritical storage vessel over the complete operating range from state point 1 to state point 5 on the diagram of FIG. 3, the maximum permissible heat leak through the vessel wall is equal to the required heat input at the critical density D on the curve of FIG. 4. This maximum permissible heat leak, of course, is determined at the minimum flow rate at which the fluid delivery system is to operate since at greater flow rates, the permissible heat leak would obviously be greater.

One method of increasing the maximum permissible heat leak is to increase the efficiency of the thermal insulation on the storage vessel. This is often difficult, if not impossible, to attain, however. Accordingly, it has been necessary in the past to provide a supercritical storage vessel of this kind with a pressure relief valve for venting off the excess fluid pressure which occurs in the vicinity of the critical density if the actual heat leak through the vessel wall exceeds the maximum permissible heat leak. The disadvantages of this venting method have been discussed earlier.

The disadvantages of both the thermal insulation method and the venting method of maintaining a constant supercritical pressure over the entire operating range of the supercritical storage vessel, principally at the critical density D, are avoided in the present supercritical storage vessel 10.

Thus, let us assume that the actual maximum heat leak which occurs through the wall of the present storage vessel in its intended operational environment exceeds the minimum required heat input occurring at the critical density D in FIG. 4 by some arbitrary amount L, as indicated in the latter figure. Let us further assume we start at state point 1 on the curve of FIG. 4 (state points 1–5 on the curve correspond to the state points 1–5, respectively, on the pressure-enthalpy diagram of FIG. 3) and that the delivery valve 92 is opened just sufficiently to attain the minimum rate of flow of fluid from the vessel 10 at which the latter is required to operate. Under these conditions, heat must be added to the fluid in the vessel from state point 1 to the state point 1a, at which the curve intersects the actual heat leak line, in order to maintain the desired supercritical pressure in the vessel.

The bypass valve 24 in the present vessel 10 is so designed that it closes the valve port 82, and thereby routes the entire flow of two-phase fluid from the pressure reducer 22 through the valve outlet 34 to the external heat exchanger circuit 86, so long as the pressure in the vessel is equal to, or less than the desired supercritical pressure operating pressure of the vessel 10. Associated with the external heat exchanger 88 is a heat source 88a, which may be ambient atmosphere, for heating the two-phase fluid flowing through the exchanger. During subsequent flow of this heated fluid through the internal heat exchanger 26 to the delivery line 90, heat is transferred to the fluid in the vessel 10 to maintain the latter fluid in its supercritical state.

As the density of the supercritical fluid remaining in the storage vessel decreases due to withdrawal of fluid from the vessel, the heat input to the fluid required to maintain the supercritical state decreases. This decrease in the required heat input combined with the heat transfer to the fluid in the vessel at the initial rate from the external heat exchanger circuit 86, tends to increase the fluid pressure in the vessel above the desired operating pressure. Bypass valve 24 is designed to progressively open valve port 82 and close valve port 80 in response to this increase in the fluid pressure above the desired operating pressure. This operation of the valve reduces the two-phase fluid flow through the external heat exchange circuit 86, and thereby also heat transfer to the supercritical fluid in the vessel 10, and simultaneously initiates flow of the two-phase fluid exhausting from the vessel directly to the internal heat exchanger 26 via the internal refrigeration circuit 94. The two-phase fluid, being at a lower temperature than both the stored supercritical fluid in the vessel and the fluid returning from the external heat exchange circuit 86, effects a refrigeration action in the internal heat exchanger 26 during which heat is absorbed, first by conversion of the liquid phase to the vapor phase and then by heating of the vapor phase. The net result of thus decreasing fluid flow through external heat exchange circuit 86 and increasing fluid flow through the internal refrigeration circuit 94 is obviously to decrease the rate of heat transfer to the supercritical fluid in the vessel 10.

The bypass valve 24 is designed to thus respond to the fluid pressure in vessel 10 in such manner that the net heat transfer to the fluid in the vessel 10 diminishes along the proper curve to maintain a constant pressure P1 (FIG. 3) in the storage vessel 10 as the supercritical fluid density decreases. Eventually, a fluid density is reached, at state point 1a, FIG. 4, at which the heat leak into the vessel equals the required heat input to maintain the desired operating pressure. At this point, the valve obturator 84 is positioned intermediate its closed positions to so divide the flow of two-phase fluid from the vessel between the external heat exchange circuit 86 and the internal refrigeration circuit 94, that the fluid flowing through the internal heat exchanger 26 is at the same temperature as the stored fluid in vessel 10, whereby no net transfer occurs between the fluid in the heat exchanger and the fluid in vessel 10.

As fluid continues to be withdrawn from the vessel 10, the heat leak into the vessel exceeds that required to maintain a constant supercritical pressure. As a result, heat must be extracted from the stored fluid in the vessel if a constant supercritical fluid pressure is to be maintained. The bypass valve 24 is so designed that as fluid withdrawal from the vessel 10 continues past state point 1a (FIG. 4) the valve further diminishes two-phase fluid flow through the external heat exchange circuit 86 and further increases two-phase fluid flow through the internal refrigeration circuit 94, whereby the temperature of the fluid flowing through the internal heat exchanger 26 gradually drops below the temperature of the stored supercritical fluid. Heat transfer now occurs, at an increasing rate, from the stored supercritical fluid in the vessel to the cooler two-phase fluid flowing through the internal heat exchanger 26. The response of the valve 24 is such that the stored fluid is maintained at constant pressure as fluid continues to be withdrawn from the vessel from state point 1a to the minimum required heat input state point 3.

Beyond state point 3, the required heat input to the stored supercritical fluid to maintain a constant pressure increases sharply. Thus, there is a tendency for the pressure to drop as fluid is withdrawn past state point 3. Accordingly, the action of the bypass valve reverses, the valve gradually diminishing two-phase fluid flow through the internal refrigeration circuit 94 and increasing two-phase fluid flow through the external heat exchange circuit 86 to first diminish refrigeration of the stored supercritical fluid and finally again effect heating of the stored fluid.

It is evident from this description that the construction of the present supercritical storage vessel is such as to increase the permissible heat leak into the vessel by the amount L in FIG. 4 during minimum flow conditions. The action of the bypass valve 24 is essentially the same, of course, when the rate of fluid flow from the vessel exceeds this minimum flow rate.

If desired, the storage vessel 10 may be provided with a safety relief valve 96 set to open at a pressure in excess of the normal operating pressure but less than the pressure necessary to rupture the vessel.

Numerous modifications in the design, arrangement of parts and instrumentalities of the invention are possible, obviously, within its spirit and scope.

I claim:
1. A fluid storage and delivery system, comprising:
   a hermetic fluid storage vessel;
   first heat exchanger means disposed in heat transfer relation to the vessel interior;
   second heat exchanger means disposed in heat transfer relation to a heat source external to said vessel;
   means communicating said vessel interior to said first heat exchanger means via a first internal flow path and a second external flow path passing through said second heat exchanger means;
   means for reducing the pressure of fluid flowing to said first heat exchanger means from said vessel interior;
   means for regulating fluid flow to said first heat exchanger means via said flow paths; and
   means for conducting fluid from said first heat exchanger means to a point of use external to said vessel.
2. The subject matter of claim 1 wherein:
   said first heat exchanger means comprises a single heat exchanger communicating to said vessel interior via both said flow paths.
3. The subject matter of claim 1 wherein:
   said regulating means comprises a proportioning valve having an inlet communicating to said vessel interior and two outlets communicating to said first heat exchanger means via said flow paths, respectively.
4. The subject matter of claim 1 wherein:
   said flow regulating means comprises a valve responsive to the fluid pressure in said vessel for increasing fluid flow to said first heat exchange means via said first path and decreasing fluid flow to said first heat exchanger means via said second path in response to increasing fluid pressure in said vessel.
5. A supercritical fluid storage and delivery system, comprising:
   a hermetic fluid storage vessel;
   a first heat exchanger within said vessel;
   a second heat exchanger on the outside of said vessel;
   a throttling valve in said vessel having an inlet communicating to the vessel interior and an outlet;
   a pressure responsive proportioning valve having an inlet communicating to said throttling valve outlet, a first outlet communicating to the inlet of said first exchanger and a second outlet communicating to the inlet of said second exchanger;
   means communicating the outlet of said second exchanger to the inlet of said first exchanger; and
   a fluid conduit extending from the outlet of said first exchanger to the exterior of said vessel.

References Cited by the Examiner
UNITED STATES PATENTS

| | | | |
|---|---|---|---|
| 2,084,297 | 6/37 | Martin | 62—50 |
| 2,344,765 | 3/44 | Dana et al. | 62—54 |
| 2,826,043 | 3/58 | Simonson | 62—51 |
| 2,842,942 | 7/58 | Johnston et al. | 62—50 |
| 3,059,441 | 10/62 | Werner | 62—51 |
| 3,089,509 | 5/63 | Collins | 137—625.5 |
| 3,096,625 | 7/63 | Legatski | 62—52 X |
| 3,097,497 | 7/63 | Fitt | 62—51 |

ROBERT A. O'LEARY, *Primary Examiner.*